Aug. 19, 1952  L. T. BARNES  2,607,826
TRIMMER CAPACITOR
Filed July 25, 1950  2 SHEETS—SHEET 1
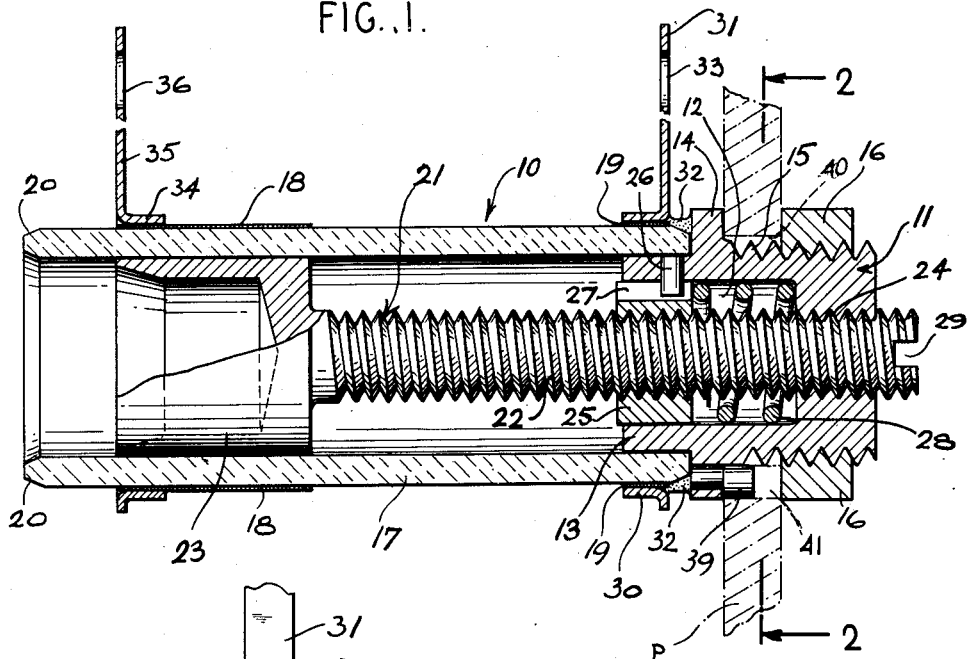
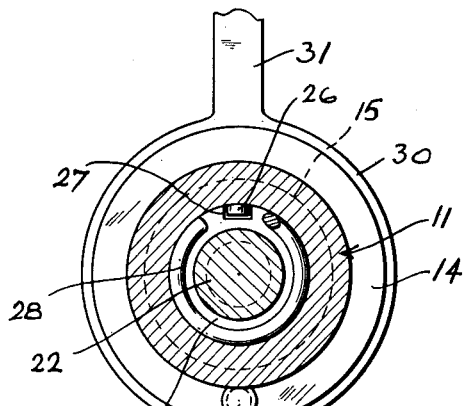
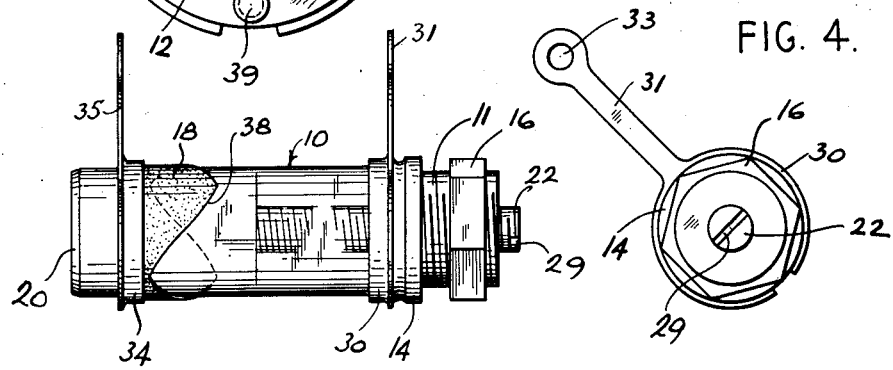
INVENTOR
LLEWELLYN T. BARNES
BY Mock & Blum
ATTORNEYS Aug. 19, 1952 — L. T. BARNES — 2,607,826
TRIMMER CAPACITOR
Filed July 25, 1950 — 2 SHEETS—SHEET 2

INVENTOR
LLEWELLYN T. BARNES
BY Mock & Blum
ATTORNEYS

Patented Aug. 19, 1952

2,607,826

UNITED STATES PATENT OFFICE 2,607,826

TRIMMER CAPACITOR

Llewellyn T. Barnes, Freeport, N. Y.

Application July 25, 1950, Serial No. 175,757

5 Claims. (Cl. 175—41.5)

My invention relates to improvements in variable electrical condensers and more particularly condensers of the trimmer type which are used to produce fine adjustments in capacity variation.

I provide a variable condenser of the type in which adjustments in capacity is accomplished by rotation of an adjusting screw, the said screw being fixed to the movable electrode of the condenser, and the electrodes of the condenser being spaced by a cylinder made of a material having a high dielectric constant. The screw turns within a nut which is held under spring tension and is also fixed against rotation relative to the screw.

One of the objects of the invention is the provision of a condenser of the type described having a very small minimum capacity which provides relatively wide capacity range, and in which extremely fine and accurate adjustment may be made within this capacity range.

Another object of the invention is the provision of a condenser of the type described whose physical construction enables it to be quickly and easily connected within an electrical circuit in an efficient manner, and also to be quickly and securely fastened to a mounting bracket, panel, chassis, or the like.

Still another object of the invention is the provision of a condenser of the type described which lends itself to smooth and easy adjustment, but which has a high degree of stability when brought to a selected adjusted position, resisting jarring, and change in temperature, and eliminating "back-lash."

A further object of the invention is the provision of a condenser of the type described which is made of a few simple parts which are easily assembled, affording economy in manufacture.

Other objects and advantages of the invention will be readily apparent in the course of the following specification when taken in connection with the accompanying drawings in which:

Fig. 1 is a section of a condenser made according to the invention;

Fig. 2 is a transverse section taken along line 2—2 of Fig. 1;

Fig. 3 is a side elevational view of the condenser shown in Fig. 1;

Fig. 4 is a front elevational view thereof;

Figure 5:
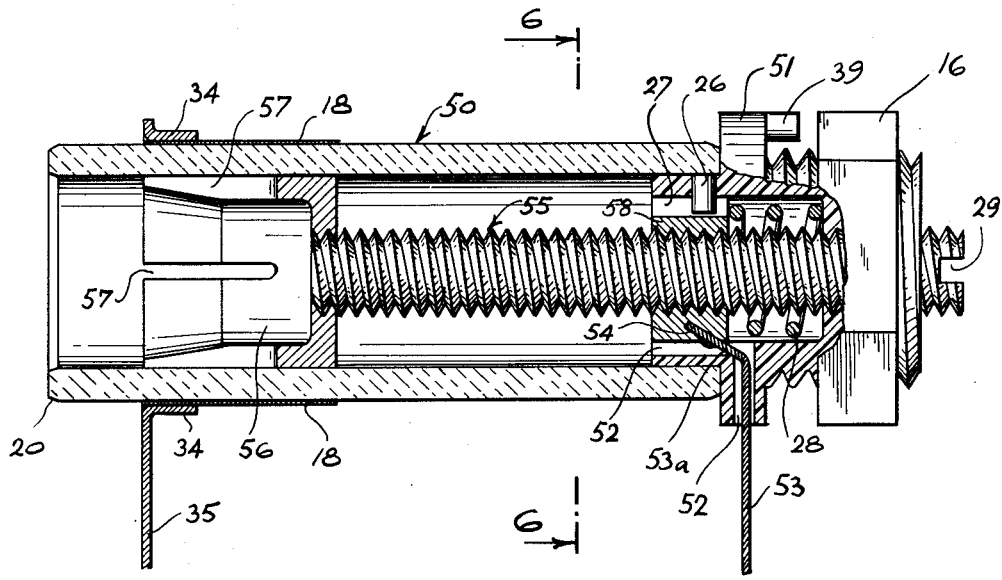
Fig. 5 is a longitudinal section of a modification of the invention.

In the drawings, Figs. 1-4 illustrate a condenser 10 made according to the present invention. Referring to Fig. 1, for convenience the left-hand end of the condenser 10 and its parts is referred to as the "front" or "forward" end, while the right-hand end is referred to as the "rear" end.

The condenser 10 has a cylindrical base 11 which has a central longitudinal well or recess 12 at its front end. The front end of base 11 has a relatively narrow wall which defines a portion 13 of reduced diameter forwardly of an outwardly-projecting peripheral flange 14. Rearwardly of the flange 14, the base 11 bears external threading 15 which is sized to mount a clamping nut 16.

A hollow cylinder 17 is rigidly and concentrically mounted to the base 11. Said cylinder 17 is made of a material having a high dielectric constant, for example quartz, glass, or polystyrene. Cylinder 17 is provided with a band 18 of silver or other conductive metal, which may be applied in the form of a coating on the outer surface of said cylinder 17 adjacent the forward end thereof, and a narrower silver band 19 adjacent its rear end. The ends of the cylinder 17 may be finished off to produce an inwardly-bevelled peripheral edge 20.

The reduced forward end portion 13 of the base 11 is inserted within the rear open end of cylinder 17, as by a force fit, with the well 12 of base 11 communicating with the interior of cylinder 17, as shown in Fig. 1. The end portion 13 of base 11 may also be cemented within said well 12 to insure a fixed and immovable relationship between the cylinder 17 and base 11.

An electrode 21 is rotatably and slidably mounted in condenser 10, said electrode 21 comprising a hollow piston or cup-like member 23 and an integral threaded stem or adjusting screw 22. The adjusting screw 22 extends through a central threaded hole or recess 24 in the rear wall of base 11, the outer end of said screw 22 normally protruding externally of the base 11. Rotation of adjusting screw 22 relative to base 11 thus moves the screw 22 and its integral piston 23 longitudinally relative to the silver band 18 of cylinder 17.

A circular nut 25 is mounted upon adjusting screw 22 intermediate the end portions thereof. Said nut 25 is sized to fit snugly within the well 12 of base 11. A pin or lug 26 is rigidly fixed to the base 11, said pin 26 extending radially inward into the well 12. As shown in Figs. 1 and 2, the pin 26 extends into a longitudinal groove 27 in the peripheral surface of nut 25, said pin 26 preventing rotational movement of the nut 25 relative to the base 11.

A compression spring 28 is seated in the well 12, one end of said spring 28 abutting the inner wall of well 12, and the other end of said spring 28 abutting the nut 25 and urging said nut toward the open end of well 12. Tension of spring 28 upon nut 25 maintains said nut 25 in firm gripping engagement with the threading of adjusting screw 22. The nut 25 not only serves as an additional support for the screw 22, insuring concentric axial alinement of said screw 22 with the body of condenser 10, but also grips the screw 22 under spring tension, eliminating "back-lash" in adjusting said screw 22. This tension upon screw 22 also permits smooth, uniform, fine adjustment of the piston 23 and maintains said screw in an exact adjusted position even though it may be subjected to jarring or the like.

The adjusting screw 22 has a slot 29 at the outer end thereof for the reception of a screw driver or similar bladed tool which may be used to facilitate the rotation thereof.

The movable electrode 21, and the base 11 are made of a conductive metal which has an extremely low or negligible coefficient of thermal expansion, such as, for example, "Invar," an iron-nickel alloy. A metallic, electrically-conductive ring 30 which bears a terminal post or lug 31 is secured to the silver band 19 of the cylinder 17, preferably by soldering. As shown at 32 in Fig. 1, sufficient solder is introduced to fill the recess formed by the bevelled end 20 of cylinder 17, and to adhere to the forward face of flange 14 of base 11. Thus the terminal post 31 is electrically connected to the base 11.

The terminal post 31 contains a hole or recess 33 by which it may be soldered, bolted, or otherwise secured to a respective terminal or lead wire of a utilization circuit in a rapid and convenient manner.

A ring 34 and integral terminal post or lug 35 which are identical to the aforementioned ring 30 and terminal post 31, are secured to the silver band 18 of the cylinder 17 by soldering or the like. The terminal post 35 contains a hole 36 by means of which it may be connected to the utilization circuit.

The silver band 18 constitutes the fixed electrode or plate of the condenser 10. This band 18 is preferably of the same length as the piston 23 which serves as the movable plate of the adjustable electrode 21. The band 18 and piston 23 are separated by the body of cylinder 17 which has a high dielectric constant. The capacitance of the condenser 10 is changed by rotating the adjusting screw 22, this rotation being translated into longitudinal movement of the piston 23 relative to the fixed electrode band 18. The piston or movable plate 23 receives its charge from the terminal post 31 through the conductive base 11 and adjusting screw 22.

The silver band 18 may be of uniform overall width, or alternatively, the rear edge of said band 18 may be of sinusoidal shape as shown at 38 in Fig. 3. The edges of band 18 may also be made of other selected shapes in order to produce variations in the rate of capacitance change as the adjusting screw 22 is rotated.

Because of the fine threading of the adjusting screw 22, it is obvious that the hollow cylinder 23 moves longitudinally a very short distance with each complete revolution of said adjusting screw 22. In the preferred embodiments shown in the drawings which are drawn substantially to scale, the adjusting screw 22 must be rotated approximately seventeen times to move the piston 23 between its position of maximum capacity shown in Fig. 1, and its position of minimum capacity in which it is located rearward spaced as far as possible from the silver band or fixed electrode 18. Thus rotation of the adjusting screw 22 affords a very fine and uniform change in capacity of the condenser. This uniformity of capacity variation is aided by the spring-tensioned nut 25 which insures even travel of the piston 23 during the slightest rotational movement of the adjusting screw 22.

When band 18 is provided with a sinuous edge 38, as shown in Fig. 3, a more rapid variation in capacity will be provided with a given rotational movement of the adjusting screw 22, than when a uniform band is provided. In this instance, as the piston 23 travels away from the silver band 18 the area of registry of the electrodes gradually decreases until the front edge of the piston 23 reaches the apices of the curves at the edge 38, at which the electrodes of the condenser are in point registry. As the piston 23 is then moved further out of proximity with the band 18, there is a gradual and progressive decrease in capacitance, without a sharp decline.

Because of the uniform, even, and fine adjustability of the condenser, it may be calibrated and used in measuring instruments for high frequencies, each turn of adjusting screw 22 representing a measurable amount of capacitance change.

The construction of the condenser 10 is such that it may be made of a preferred over-all length of one inch, exclusive of the adjusting screw 22. In a condenser of this size having a glass cylinder 17 and a silver band with a sinusoidal edge 38, the condenser has a range of from .4 to 3.0 micro-microfarads in fifteen full turns of the adjusting screw 22 from its position of maximum capacity shown in Fig. 1.

The flange 14 of base 11 may be provided with a dowel pin 39 which is used to orientate the condenser 10 when the same is secured to a panel, bracket, or the like. The panel or bracket P has the usual hole or opening 40 for the reception of the condenser 10, the threaded end of base 11 extending through this hole or opening and the clamping nut 16 clamping the flange 14 of base 11 against the panel or bracket P. Said panel or bracket P is also provided with a hole or recess 41, which is sized and positioned to receive the dowel pin 39. When the condenser 10 is clamped in position, the dowel pin 39 within the hole 41 of the panel P prevents the condenser 10 from rotating with the adjusting screw 22.

Figure 6:
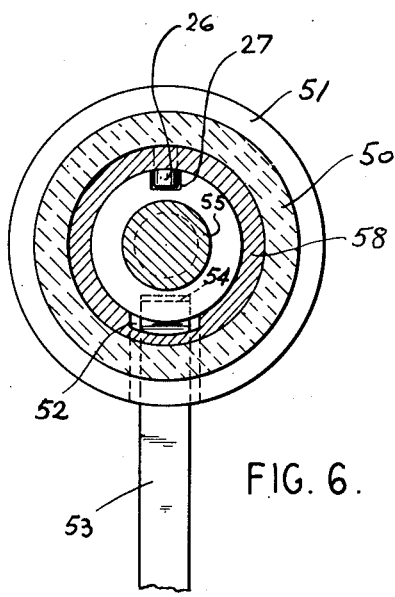
Fig. 6 is a transverse section taken along line 6—6 of Fig. 5.
Figure 7:
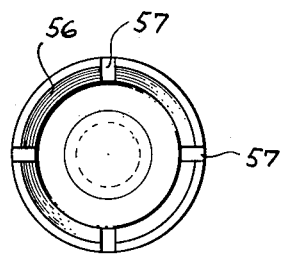
Fig. 7 is an end view of the inner or movable electrode of the condenser shown in Fig. 5.

Figs. 5–7 disclose a modification of the invention in which a condenser 50 is shown, said condenser 50 being similar in most respects to the condenser 10 of Figs. 1–4, except that it is insulated from the panel on which it is to be attached. This condenser 50 may therefore be utilized, without supplementary insulating means, for attachment to a panel or bracket which is grounded in the utilization circuit.

The parts of the condenser 50 which are similar to those of the condenser 10 shown in Fig. 1, are given identical reference numerals and will not be again described in detail.

The base 51 is made of an insulating material such as a suitable plastic, hard rubber, or a non-conductive metal. The projecting peripheral flange of said base has an L-shaped slot 52 for the reception of a terminal post 53. The end 53a of said terminal post 53 is bent angularly, and is fixed within a groove 54 in the circular nut 58.

Thus the entire outer surface of the condenser 50 is electrically insulated except for the terminal posts 35 and 53.

The condenser 50 has a movable electrode which includes a hollow conductive cylinder or piston 56. Said piston 56 is sized to fit snugly within the dielectric cylinder 17, and for this purpose, the hollow cylinder 56 is provided with evenly spaced longitudinal slots 57, shown in Figs. 5 and 7. The slots 57 allow for possible expansion of the hollow cylinder 56, enabling such expansion to be compensated for without an increase in circumference of the snug-fitting hollow cylinder 56.

While preferred embodiments of the invention have been shown and described herein, it is obvious that numerous additions, changes, and omissions may be made without departing from the spirit and scope thereof.

I claim:

1. In a variable electrical reactance unit having a hollow cylindrical body and an adjustable reactance-varying member which has a threaded stem in axial alinement with said cylindrical body and a portion extending within said cylindrical body, a mounting assembly secured to one end of said body and having a recess in axial alinement with said body and communicating with the hollow interior thereof, said recess being closed by an end wall which contains a threaded hole, a nut contained within said recess and being longitudinally slidable therein, means holding said nut from rotation within said recess, said nut containing a hole in axial alinement with the hole in said end wall, said threaded stem extending through both said holes, said nut being spaced from said end wall, and spring means urging said nut away from said end wall whereby to maintain tension on the threads of said stem in a direction parallel to the longitudinal axis of said stem, in any adjusted position of said reactance-varying member.

2. In a variable electrical reactance unit having a hollow cylindrical body and an adjustable member which is movable longitudinally within said body to vary the reactance of said unit, a mounting assembly secured to one end of said body and having a cylindrical bore in axial alinement with said body and communicating with the hollow interior thereof, said mounting assembly having an end wall closing off the outer end of said bore, said end wall containing a threaded hole, said bore containing a circular nut spaced from said end wall, the periphery of said nut slidably abutting the peripheral wall of said bore, said bore having a threaded hole in axial alinement with said end wall hole, said adjustable member having a threaded stem and a portion extending within said cylindrical body, said threaded stem extending through both said holes, means to prevent rotation of said nut within said bore, and spring means urging said nut away from said end wall, whereby to maintain tension on the threads of said stem in a direction parallel to the longitudinal axis of said stem.

3. A trimmer capacitor comprising an insulator body having a longitudinal bore, a conductive coating on the outside of said body, a mounting base secured to one end of said body and having a threaded aperture therein, means defining a cavity in said mounting base opening into the bore of said body, a threaded nut slidably received in said cavity for movement in the direction of the length of said body, means for restraining said nut against rotation, a conductive element received in said bore and having a threaded shank in engagement with the threads of said mounting base and of said nut, and resilient means biasing said nut towards said conductive element.

4. A trimmer capacitor in accordance with claim 3, in which said nut is spaced away from the aperture in said mounting base in the direction of the length of said body.

5. A trimmer capacitor in accordance with claim 3, in which said resilient means comprises a coil spring surrounding said shank between said nut and the outer end of said mounting base.

LLEWELLYN T. BARNES.

REFERENCES CITED

The following references are of record in the file of this patent:

UNITED STATES PATENTS

| Number | Name | Date |
| --- | --- | --- |
| 1,874,491 | Fritschi | Aug. 30, 1932 |
| 2,386,732 | Wohlhieter | Oct. 9, 1945 |
| 2,390,009 | Stott | Nov. 27, 1945 |
| 2,503,084 | White | Apr. 4, 1950 |
| 2,504,758 | Thias | Apr. 18, 1950 |

FOREIGN PATENTS

| Number | Country | Date |
| --- | --- | --- |
| 243,318 | England | Dec. 20, 1926 |
| 560,372 | England | Mar. 31, 1944 |
| 602,270 | Germany | Sept. 5, 1934 |